United States Patent [19]
Schroeder

[11] Patent Number: 6,160,928
[45] Date of Patent: Dec. 12, 2000

[54] FAULT TOLERANT OPTICAL SWITCH

[75] Inventor: Dale W. Schroeder, Scotts Valley, Calif.

[73] Assignee: Agilent Technologies, Inc., Palo Alto, Calif.

[21] Appl. No.: 09/293,329

[22] Filed: Apr. 16, 1999

[51] Int. Cl.[7] .................................................. G02B 6/26
[52] U.S. Cl. ............................................... 385/18; 385/17
[58] Field of Search ........................................ 385/16–19

[56] References Cited

U.S. PATENT DOCUMENTS 4,121,884  10/1978  Greenwood .
5,699,462  12/1997  Fouquet et al. ............................. 385/18

*Primary Examiner*—James Phan

[57] ABSTRACT

A fault tolerant optical switch allows fault tolerance and redundant operation in an optical switching matrix. A plurality of redundant switch elements and waveguides and an optical reflector enable the fault tolerant optical switch to provide a spare optical path around a failed switch element. The redundant path may be established and maintained until the failed switch element can be replaced at which time the redundant path may again be available to provide a spare optical path in case of another switch element failure.

5 Claims, 6 Drawing Sheets

FAULT TOLERANT OPTICAL SWITCH

TECHNICAL FIELD

The present invention relates generally to optical switches, and, more particularly, to a fault tolerant optical switch.

BACKGROUND OF THE INVENTION

Communication technology has progressed significantly in the past few years. Today, much information is carried over optical communications fiber. This technology, know as fiber optic technology allows the transport of information at data rates currently exceeding millions of bits of information per second. Part of the technology that enables this optical communication is the ability to direct light onto an optical fiber and switch that light appropriately. Typically, a number of optical fibers are combined into a fiber optic cable. When a fiber optic cable is carrying many individual signals over large distances, it is necessary to have the ability to switch those signals onto other fiber optic cables. A mesh of fiber optic cable infrastructure spans the world. At certain places in the mesh it is desirable to have the ability to switch the light signals from one fiber optic cable to another. A typical fiber optic cable may be comprised of a plurality of individual optical fibers bound together, for example, in a ribbon arrangement. A typical fiber optic ribbon cable may contain 32 individual optical fibers. Each optical fiber is capable of carrying one signal, or in the case of dense wave division multiplexing (DWDM), in which many signals may be multiplexed onto a single optical fiber through the use of multiple colors of light, each optical fiber may carry a plurality of light colors (wavelengths), each color carrying a single signal.

Optical switches capable of routing light from one direction to another have been known for some time. A new type of optical switch element, known as a non-blocking optical switch element, is disclosed in commonly assigned U.S. Pat. No. 5,699,462 to Fouquet et al., in which optical switch elements are located at an intersection of two optical waveguides. Depending on the state of a material within the optical switch element, light is either transmitted through the switch element continuing axially on the original waveguide, or reflected by the switch element onto a waveguide that intersects the original waveguide. The switch element is filled with a material that, while in a transmissive state, has an index of refraction substantially equal to that of the waveguide, thus allowing light in the waveguide to pass through the switch element. In this state the switch element is considered non-blocking. The state of the material within the switch element may be changed, through the operation of heaters or the like within the switch element, so as to cause a gas, or bubble, to be formed within the switch element. While present in the switch element the bubble causes a refractive index mismatch between the waveguide and the switch element, thus causing the light in the waveguide to be reflected onto the intersecting waveguide. This state is known as the reflective state. The operation of a preferred and many alternative embodiments of the non-blocking switch element is set forth in detail in commonly assigned U.S. Pat. No. 5,699,462 to Fouquet et al., which is hereby incorporated by reference.

When placed at an intersection of two waveguide segments, one of the above-mentioned optical switch elements forms an optical switch point, which may be used to switch signals on a plurality of optical fibers. The optical switch points may be further arranged so as to form a switching matrix. For example, when arranged in a 32×32 matrix, formed by 32 rows and 32 columns of optical switch points, a 32 fiber optic ribbon cable can be connected to 32 input lines and another 32 fiber optic ribbon cable can be connected to 32 output lines, the output lines intersecting the 32 input lines. Because a switch element is located at each optical switch point it is possible to switch any of the 32 input lines to any of the 32 output lines. In this manner, optical signals may be directed from one fiber optic cable onto another, resulting in a compact optical switch.

One drawback with the above-described optical switching matrix is that because there are exactly 32 inputs and 32 outputs for the two 32 fiber optic ribbon cables, if one optical switch point fails, there is no way in which to connect the respective input to the respective output corresponding to the failed optical switch point.

Therefore, it would be desirable if there were a way to provide fault tolerance and redundancy for the above-described optical switch matrix.

SUMMARY OF THE INVENTION

The invention provides a fault tolerant optical switch, particularly suited for use in fiber optic interconnect systems.

In architecture, the present invention may be conceptualized as a fault tolerant optical switch comprising a plurality of intersecting waveguide segments, a plurality of crosspoint switch elements, each of the crosspoint switch elements configured to allow the passage of light when in a transmissive state and configured to reflect light when in a reflective state. Each crosspoint switch element is located at an intersection of two of the waveguide segments. Each intersection of two waveguide segments and each of the plurality of crosspoint switch elements defines an optical switch point, wherein the placement of the crosspoint switch element on a first side of the intersection of two waveguide segments defines a first type optical switch point, a plurality of first type optical switch points configured in a matrix, the matrix comprising a plurality of rows and columns. Also included is an additional row of first type optical switch points, an additional column of first type optical switch points and an optical reflector located at an intersection of the additional row and the additional column of the first type optical switch points.

The present invention may also be conceptualized as providing a method for constructing a fault tolerant optical switch comprising the following steps: forming a plurality of intersecting waveguide segments, forming a plurality of crosspoint switch elements, wherein each of the crosspoint switch elements is configured to allow the passage of light when in a transmissive state and configured to reflect light when in a reflective state. Each crosspoint switch element is located at an intersection of two of the waveguide segments, wherein each of the crosspoint switch elements and the intersection of two waveguide segments form an optical switch point. The placement of the crosspoint switch element on a first side of the intersection of two waveguide segments defines a first type optical switch point. A plurality of optical switch points are arranged in a matrix, the matrix having rows and columns. Added to the matrix are an additional row of first type optical switch points and an additional column of first type optical switch points, and also added is an optical reflector at an intersection of the additional row and the additional column of first type optical switch points.

The invention has numerous advantages, a few of which are delineated, hereafter, as merely examples.

An advantage of the invention is that it provides for fault tolerance and redundancy in an optical switch matrix.

Another advantage of the invention is that allows an optical switch matrix to remain in service while an inoperable switch element is being serviced.

Another advantage of the invention is that it provides a spare switching path for an optical switch matrix.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

Figure 1A:
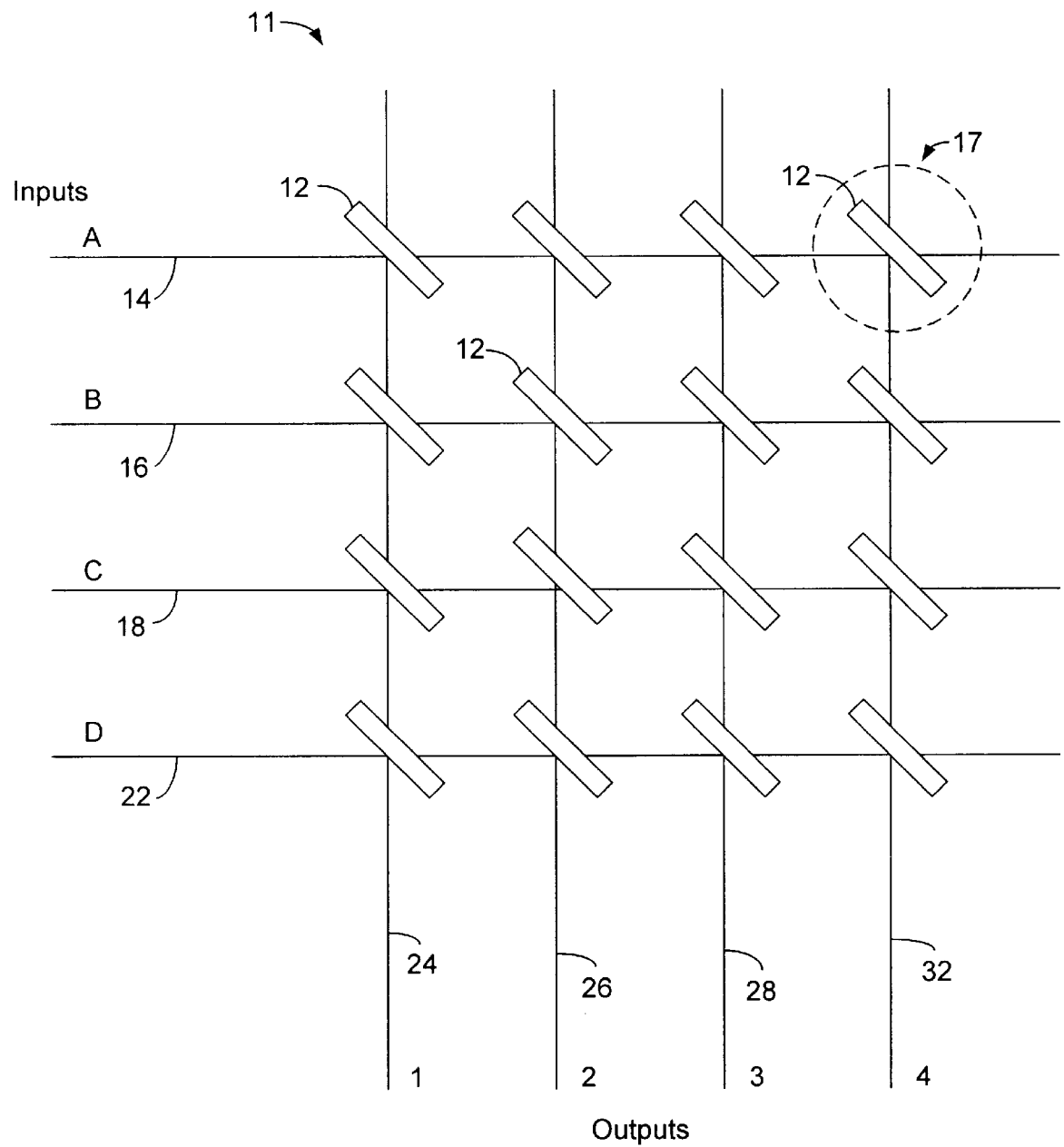
FIG. 1A is a schematic view illustrating an optical switch matrix.

Turning now to the drawings, FIG. 1A is a view illustrating an optical switch matrix 11. Optical switch matrix 11 includes a plurality of crosspoint switch elements 12. Each crosspoint switch element 12 is located at an intersection of two waveguide segments. The combination of crosspoint switch element 12 and the intersection of two waveguide segments forms an optical switch point 17. Each waveguide intersection has a crosspoint switch element associated therewith, thus forming an optical switch point at each intersection. An illustrative first type optical switch point is illustrated within the dotted circle 17 and will be described in detail with respect to FIGS. 1B and 1C. Crosspoint switch elements 12 are fabricated in accordance with the techniques disclosed in commonly assigned U.S. Pat. No. 5,699,462 to Fouquet, et al., which is hereby incorporated by reference. The operation of crosspoint switch element 12 will be illustrated herein with respect to FIGS. 1B and 1C, however the detail of construction of crosspoint switch elements 12 will be omitted as it is set out in full detail in the above-referenced commonly assigned U.S. patent.

Crosspoint switch elements 12 are arranged in a matrix formed by the intersection of input waveguides 14, 16, 18, 22 (also designated as inputs A, B, C and D) and output waveguides 24, 26, 28 and 32 (also designated as outputs 1, 2, 3 and 4), respectively. Input waveguides 14, 16, 18 and 22 and output waveguides 24, 26, 28 and 32 may be supported by a substrate that forms the basis of optical switch matrix 11 as explained in U.S. Pat. No. 5,699,462. While illustrated as single lines, input waveguides 14, 16, 18, 22 and output waveguides 24, 26, 28 and 32 are channels supported by a substrate and through which light travels. While illustrated as a matrix of four rows and four columns for a total of 16 optical switch points, optical switch matrix 11 may be comprised of any number of input waveguides and output waveguides, having a commensurate number of crosspoint switch elements at the intersections thereof. Furthermore, while illustrated as intersecting at right angles, input waveguides 14, 16, 18, 22 and output waveguides 24, 26, 28 and 32 may intersect at angles other than right angles. Typically, optical switch matrix 11 will be a 32×32 matrix having 32 input waveguides and 32 output waveguides, but may also be larger. For example, four 32×32 matrices may be joined to form a 64×64 switch matrix For simplicity, a 4×4 optical switch matrix is illustrated herein.

Furthermore, while illustrated as continuous waveguide sections 14, 16, 18, 22 and 24, 26, 28 and 32, each crosspoint switch element 12 occupies a trench, thus resulting in each input waveguide and each output waveguide being comprised of a plurality of waveguide segments.

Crosspoint switch elements 12 are non-blocking, in that when filled with an index matching medium, such as a liquid having a refractive index approaching that of the waveguide segment, crosspoint switch element 12 will allow light traveling in the waveguide to pass directly through the switch without being reflected and with a small amount of attenuation. Similarly, when devoid of an index matching medium, such as when crosspoint switch element 12 is filled with a gas, or bubble, as disclosed in U.S. Pat. No. 5,699,462, light is reflected, into an adjoining waveguide, instead of being transmitted through the switch element.

In use, the waveguide segments may be connected to optical fibers at the inputs and outputs. Input waveguides 14, 16, 18 and 22 and output waveguides 24, 26, 28 and 32 may be connected to optical fiber ribbon cable using optical fiber connectors, the waveguides being typically spaced on the order of 0.25 millimeters apart.

Figure 1B:
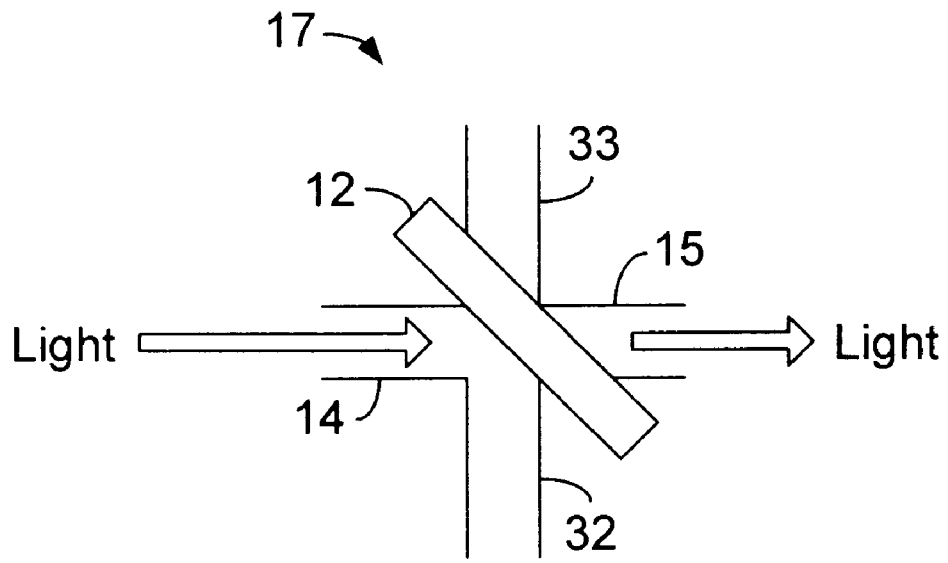
FIG. 1B is a schematic view illustrating a first type optical switch point of FIG. 1A in a transmissive state.

With reference now to FIG. 1B, shown is a detail view of optical switch point 17. Crosspoint switch element 12 is located at, and is positioned substantially diagonally across, the intersection of input waveguide 14 and output waveguide 32. As discussed above, input waveguide 14 also includes segment 15 and output waveguide 32 also includes segment 33, the segments defined by the placement of crosspoint switch element 12. FIG. 1B illustrates crosspoint switch element 12 in a transmissive state in which light entering input waveguide 14 passes through crosspoint switch element 12 into input waveguide segment 15. In this condition, crosspoint switch element 12 is considered non-blocking. Crosspoint switch element 12 is typically filled with a medium, such as a liquid, that has an index of refraction approaching that of the input waveguide 14, thus allowing light traveling through waveguide 14 to pass through crosspoint switch element 12 with a minimal amount of attenuation.

The combination of crosspoint switch element 12 and the intersection of waveguide segments 14 and 32, results in first type optical switch point 17. A plurality of first type optical switch points comprise optical switch matrix 11.

Figure 1C:
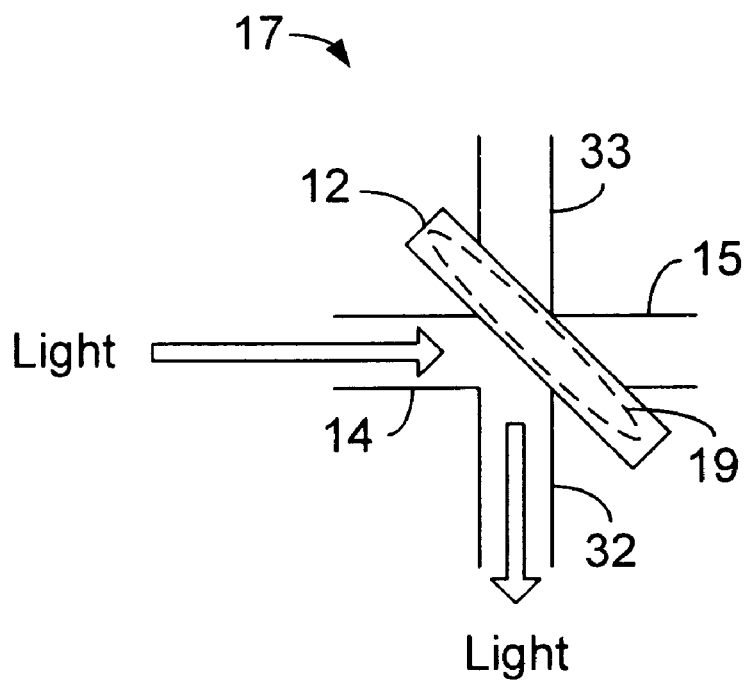
FIG. 1C is a schematic view illustrating a first type optical switch point of FIG. 1A in a reflective state.

FIG. 1C is a view illustrating first type optical switch point 17, illustrating crosspoint switch element 12 in a reflective state. As can be seen, crosspoint switch element 12 includes bubble 19, which depicts a condition of switch element 12 in which the switch cavity is devoid of index matching material. Bubble 19 may be created by heating the liquid in switch element 12 until a gas is formed. While in this reflective state, light traveling through waveguide 14 does not pass through switch element 12 into waveguide segment 15, but is instead reflected into output waveguide segment 32. In this state, crosspoint switch element 12 is said to be reflective in that it is switching the light from waveguide segment 14 into output waveguide segment 32.

Referring back to FIG. 1A, optical switch points 17 are said to be first type, because of their respective location on one side of the intersections of input waveguides 14, 16, 18, 22 and output waveguides 24, 26, 28 and 32, respectively. As can be seen from detail 17 in FIGS. 1B and 1C, light traveling in input waveguides 14, 16, 18 and 22 may either be transmitted through crosspoint switch elements 12 or may be reflected into output waveguides 24, 26, 28 and 32. When any crosspoint switch element is in a reflective state, the respective input waveguide and output waveguide cannot be used to transmit any other light signal. For example, if the optical switch point at location B3 (the intersection of input waveguide 16 and output waveguide 28) is in a reflective state, it means that light traveling in input waveguide 16 is reflected by the switch element 12 at position B3 so that the light exits through output waveguide 28. Essentially, optical switch matrix 11 can switch any of the four inputs A, B, C or D onto any of the four outputs 1, 2, 3 or 4 at any given time.

Figure 2A:
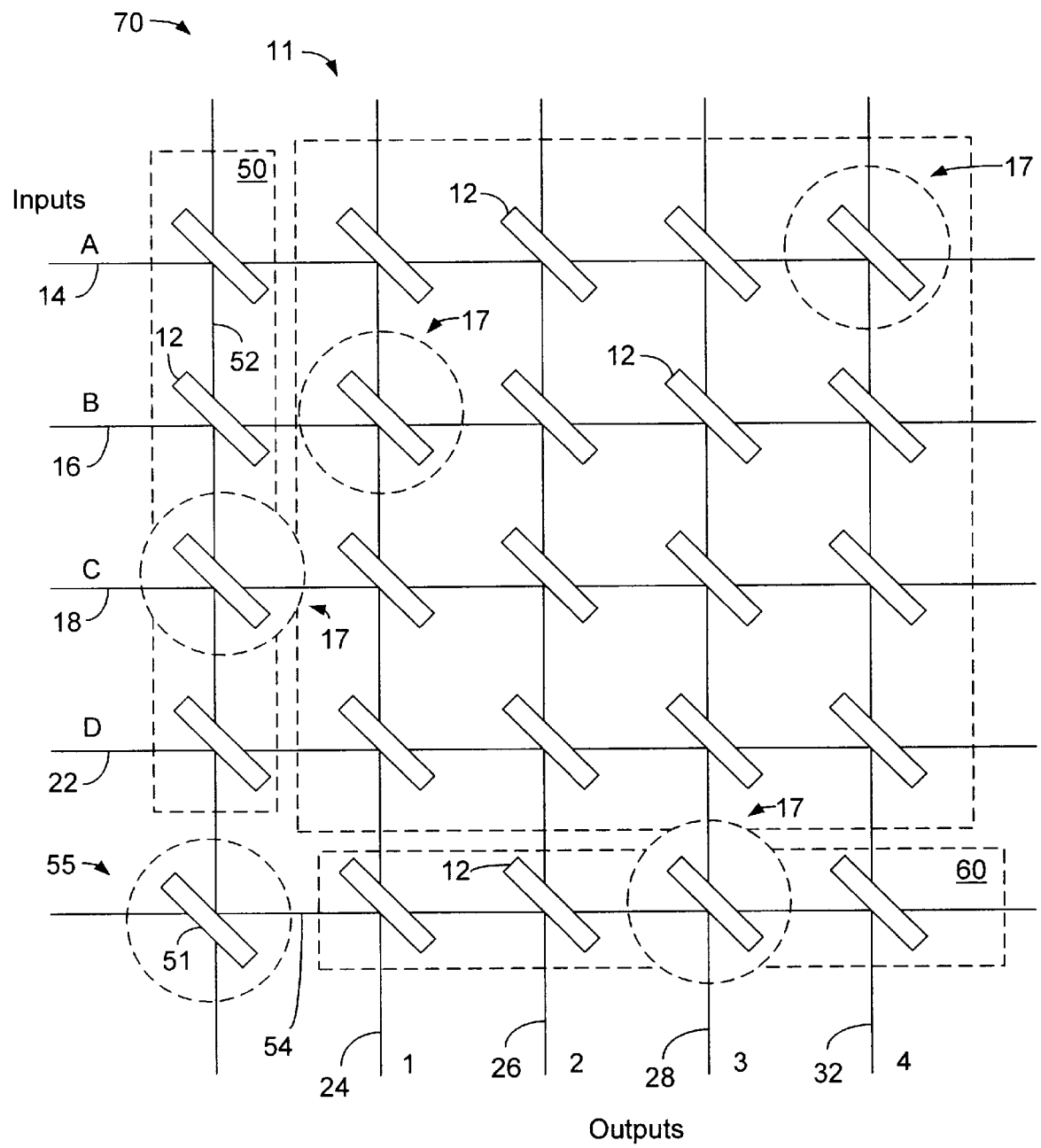
FIG. 2A is a schematic view illustrating a fault tolerant optical switch matrix constructed in accordance with the present invention.

FIG. 2A is a view illustrating optical switch matrix 11 with the addition of column 50, row 60, and optical reflector 51. Column 60 and row 50 include first type optical switch points 17. Also added are additional column waveguide 52 and additional row waveguide 54. As can be seen, additional column 50 and additional row 60 include first type optical switch points 17, which, in turn, include crosspoint switch elements 12, the switch elements being identical to crosspoint switch elements 12 that are part of optical switch matrix 11. Furthermore, second type optical switch point 55 resides at the intersection of additional column waveguide 52 and additional row waveguide 54. Second type optical switch point 55 may be an optical reflector or a crosspoint switch element 51 similar to crosspoint switch element 12 described above, but situated on an opposing side of the intersection of additional column waveguide 52 and additional row waveguide 54 than that of crosspoint switch elements 12 with respect to input waveguides 14, 16, 18 and 22 and output waveguides 24, 26, 28 and 32, thus forming a "second type" optical switch point 55. It should be noted that second type optical switch point 55 located at the intersection of additional column 50 and additional row 60 must switch light in a direction opposite that of the optical switch points 17 in optical switch matrix 11. Therefore, crosspoint switch element 51 is located at an opposite side of the intersection of waveguides 52 and 54, and hence, the optical switch point is referred to as a "second" type optical switch point 55.

As can be seen from the arrangement depicted in FIG. 2A, second type optical switch point 55 is configured to reflect light from additional column waveguide 52 onto additional row waveguide 54 in a direction opposite that of first type optical switch points 17. Together, optical switch matrix 11, additional column 50, additional row 60, all of the first type optical switch points 17 contained therein, and second type optical switch point 55 form an improved fault tolerant optical switch matrix 70.

Figure 2B:
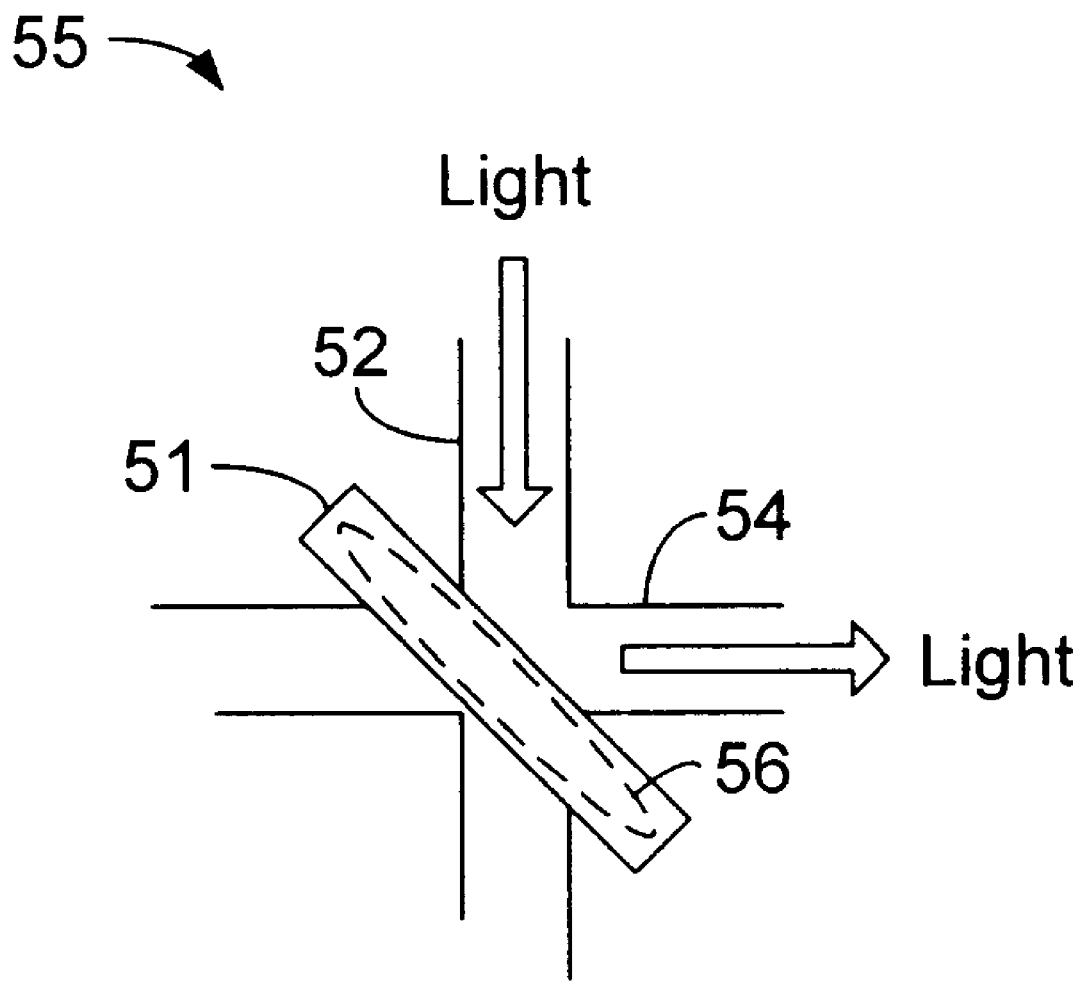
FIG. 2B is a schematic view illustrating an optical reflector of FIG. 2A.

Turning now to FIG. 2B, shown is detail view 55 illustrating second type optical switch point 55. Crosspoint switch element 51 resides at the intersection of additional column waveguide 52 and additional row waveguide 54, and in a preferred embodiment, can be a crosspoint switch element identical to crosspoint switch elements 12. However, because the crosspoint switch element 51 is located on an opposing side of the intersection of two waveguides than the crosspoint switch element 12 of first type optical switch points 17, the optical switch point 55 is considered a "second type".

Alternatively, crosspoint switch element 51 can be what is known in the art as a "dry trench", which is incapable of switching between a transmissive state and a reflective state and always maintains a reflective state. Thus, light approaching crosspoint switch element 51 through waveguide 52 may be reflected onto waveguide 54 if crosspoint switch element 51 is either a dry trench, or a second type optical switch point in a reflective state characterized by the presence of bubble 56. If crosspoint switch element 51 is a second type optical switch point in a transmissive state, then light traveling in additional column waveguide 52 will pass through element 51. When joining a plurality of fault tolerant optical switch matrices 70 to form a larger optical switch matrix, then second type optical switch point 55 should contain a crosspoint switch element 51.

Figure 3:
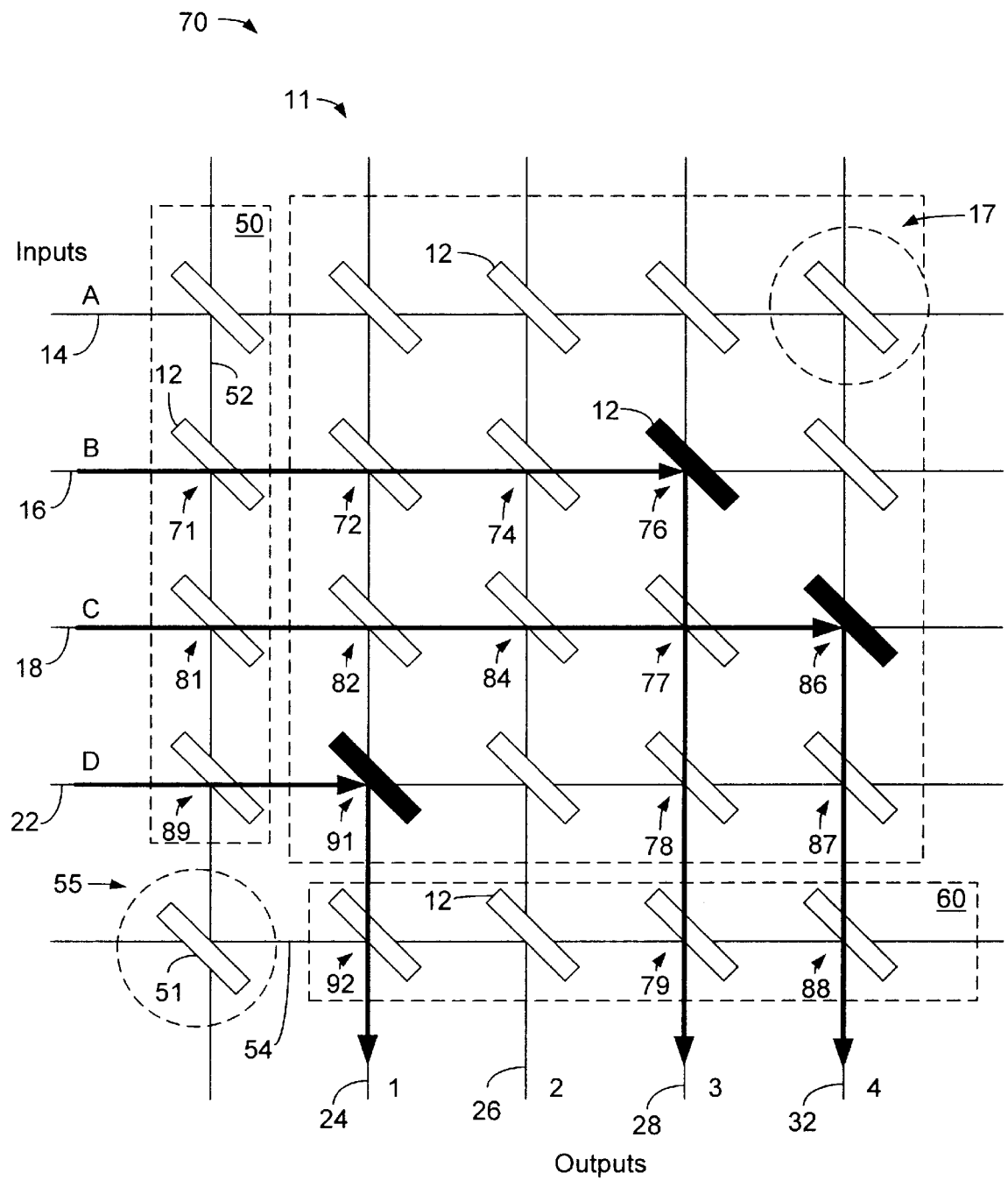
FIG. 3 is a schematic view illustrating the fault tolerant optical switch matrix of FIG. 2A in a normal operational mode.

FIG. 3 is a schematic view illustrating fault tolerant optical switch matrix 70 in a normal operational mode. As indicated by the heavy lines, an input light source traveling through input waveguide 16 from input B travels through first type optical switch points 71, 72 and 74, respectively located at the intersections of input waveguide 16 and additional column waveguide 52, input waveguide 16 and output waveguide 24, and input waveguide 16 and output waveguide 26. The light in input waveguide 16 is reflected by the first type optical switch point 76 located at the intersection of input waveguide 16 and output waveguide 28 (position B3) from input waveguide 16 onto output waveguide 28. The light then passes through the first type optical switch points 77, 78 and 79, respectively located at the intersections of input waveguide 18 and output waveguide 28, input waveguide 22 and output waveguide 28 and additional row waveguide 54 and output waveguide 28, thus illustrating the non-blocking feature of crosspoint switch elements 12 when in a transmissive state as described above. Crosspoint switch elements 12 that are in a reflective state are depicted in bold.

In similar fashion to that described above, light traveling on input waveguide 18 is transmitted through first type switch points 81, 82, 84 and 77 and is reflected onto output waveguide 32 by the first type optical switch point 86 located at the intersection of input waveguide 18 and output waveguide 32 (position C4). The light is then transmitted through first type optical switch points 87 and 88 and directed to output 4. Similarly, light traveling on input waveguide 22 is transmitted through first type optical switch point 89 and is directed onto output waveguide 24 by the first type optical switch point 91 located at the intersection of input waveguide 22 and output waveguide 24 (position D1) and is transmitted through first type optical switch point 92 and directed to output 1.

Figure 4:
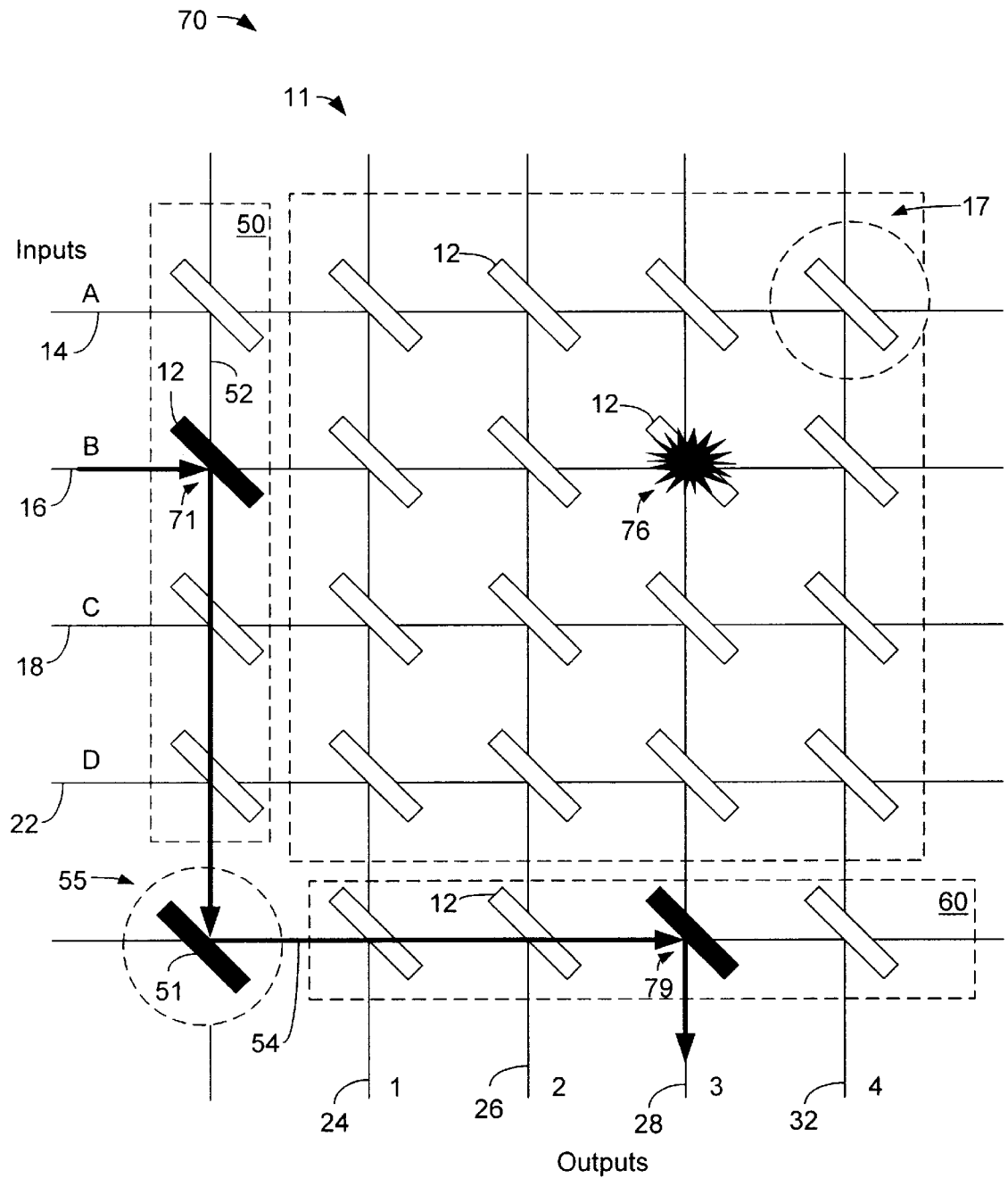
FIG. 4 is a schematic view illustrating the fault tolerant optical switch matrix of FIG. 2A operating in a mode which bypasses a failed optical switch point in accordance with the invention.

FIG. 4 is a view illustrating fault tolerant optical switch matrix 70 operating in a mode which bypasses a failed optical switch point.

Assume that the first type optical switch point 76 located at the intersection of input waveguide 16 and output waveguide 28 (position B3) has experienced a failure. This failure may be characterized by the switch element's inability to enter a reflective state in a manner that is sufficient to redirect the light from input waveguide 16 to output waveguide 28. In the event of a failure, such as that just described, the redundant optical switch point 71 located at the intersection of input waveguide 16 and additional column waveguide 52 and the redundant optical switch point 79 located at the intersection of additional row 54 and output waveguide 28 may be made reflective by displacing the index matching material contained therein.

In combination with second type optical switch point 55, it can be seen from FIG. 4 that additional column 50 and additional row 60 provide an alternative path for connecting the light source from input waveguide 16 to output waveguide 28.

In this manner, one additional column and one additional row of first type optical switch points together with a second type optical switch point can provide an alternate path in the event of a failure of any one first type optical switch point contained in optical switch matrix 11. Furthermore, optical switch matrix 70 may remain in use while the information switched through the failed element is rerouted.

It will be obvious to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

What is claimed is:

1. A fault tolerant optical switch, comprising:

a plurality of intersecting waveguide segments;

a plurality of crosspoint switch elements, each of said crosspoint switch elements configured to allow the passage of light when in a transmissive state and configured to reflect light when in a reflective state, each crosspoint switch element located at an intersection of two of said waveguide segments, each said intersection of two waveguide segments and each of said plurality of crosspoint switch elements defining an optical switch point, wherein the placement of said crosspoint switch element on a first side of said intersection of two waveguide segments defines a first type optical switch point, a plurality of said first type optical switch points configured in a matrix, said matrix comprising a plurality of rows and columns;

an additional row of said first type optical switch points and an additional column of said first type optical switch points; and an optical reflector located at an intersection of said additional row and said additional column of said first type optical switch points, wherein said optical reflector comprises a second type optical switch point defined by the placement of said crosspoint switch element on a second side of said intersection of two waveguide segments.

2. The optical switch of claim 1, wherein said additional row of first type optical switch points is positioned adjacent to a row of said matrix, and said additional column of first type optical switch points is positioned adjacent to a column of said matrix.

3. A method for constructing a fault tolerant optical switch, comprising the steps of:

forming a plurality of intersecting waveguide segments;

forming a plurality of crosspoint switch elements, wherein each of said crosspoint switch elements is configured to allow the passage of light when in a transmissive state and configured to reflect light when in a reflective state, each crosspoint switch element located at an intersection of two of said waveguide segments, wherein each of said crosspoint switch elements and said intersection of two waveguide segments form an optical switch point, wherein the placement of said crosspoint switch element on a first side of said intersection of two waveguide segments defines a first type optical switch point, a plurality of said first type optical switch points arranged in a matrix, the matrix having rows and columns;

adding to said matrix an additional row of said first type optical switch points and an additional column of said first type optical switch points; and adding an optical reflector at an intersection of said additional row and said additional column of said first type optical switch points, wherein said optical reflector comprises a second type optical switch point, said second type optical switch point formed by the placement of said crosspoint switch element on a second side of said intersection of two of said waveguide segments.

4. The method of claim 3, further comprising the steps of:

making reflective at least one first type optical switch point in said additional row and making reflective at least one first type optical switch point in said additional column in order to direct a light signal in the direction of said optical reflector in a manner in which a failed first type optical switch point may be bypassed.

5. The method of claim 3, wherein said additional row of said first type optical switch points is formed adjacent to a row in said matrix and said additional column of said first type optical switch points is formed adjacent to a column in said matrix.

* * * * *